United States Patent
Baluja et al.

(10) Patent No.: US 9,342,583 B2
(45) Date of Patent: *May 17, 2016

(54) BOOK CONTENT ITEM SEARCH

(71) Applicant: Google Inc., Mountain View, CA (US)

(72) Inventors: Shumeet Baluja, Leesburg, VA (US); Yushi Jing, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/658,311

(22) Filed: Mar. 16, 2015

(65) Prior Publication Data

US 2015/0186501 A1     Jul. 2, 2015

Related U.S. Application Data

(63) Continuation of application No. 13/764,013, filed on Feb. 11, 2013, now Pat. No. 9,009,170, which is a continuation of application No. 13/298,348, filed on Nov. 17, 2011, now Pat. No. 8,375,036, which is a continuation of application No. 12/351,336, filed on Jan. 9, 2009, now Pat. No. 8,095,546.

(51) Int. Cl.
*G06F 17/27* (2006.01)
*G06F 17/30* (2006.01)

(52) U.S. Cl.
CPC ...... *G06F 17/30616* (2013.01); *G06F 17/2705* (2013.01); *G06F 17/3053* (2013.01); *G06F 17/30958* (2013.01)

(58) Field of Classification Search
CPC ............ G06F 17/2705; G06F 17/3053; G06F 17/30616; G06F 17/30958
See application file for complete search history.

(56) References Cited

U.S. PATENT DOCUMENTS

| | | |
|---|---|---|
| 6,002,998 A | 12/1999 | Martino |
| 6,886,007 B2 | 4/2005 | Leymann |
| 7,359,851 B2 | 4/2008 | Tong |
| 7,571,157 B2 | 8/2009 | Chowdhury |
| 7,634,466 B2 | 12/2009 | Rose |
| 7,668,887 B2 | 2/2010 | Vella |
| 8,095,546 B1 | 1/2012 | Baluja et al. |
| 8,316,032 B1 | 11/2012 | Baluja et al. |
| 8,375,036 B1 | 2/2013 | Baluja et al. |
| 8,510,314 B1 | 8/2013 | Baluja et al. |

(Continued)

OTHER PUBLICATIONS

Brin & Page, Anatomy of a Large-Scale Hypertextual Web Search Engine [online][retrieved on Jan. 7, 2009] [retrieved from http://infolab.stanford.edu/~backrub/google.html], 17 pages.

(Continued)

*Primary Examiner* — Jorge A Casanova
(74) *Attorney, Agent, or Firm* — Fish & Richardson P.C.

(57) ABSTRACT

Methods, systems, and apparatus, including computer program products are provided for ranking distinct book content items based on implicit links to other distinct book content items. The implicit links are defined based on the identification of matching features in the distinct book content items. In some implementations, the matching features are uncommon phrases in textual content of the distinct book content items. Edges representing implicit links are generated between distinct nodes representing distinct book content items in a weighted graph. Search results for distinct book content items can be ordered based on the edges connected to the distinct nodes in the weighted graph that represent the distinct book content items.

17 Claims, 6 Drawing Sheets

(56) References Cited

U.S. PATENT DOCUMENTS

| | | | |
|---|---|---|---|
| 9,009,170 | B1 | 4/2015 | Baluja et al. |
| 9,043,338 | B1 | 5/2015 | Baluja et al. |
| 2002/0042792 | A1 | 4/2002 | Nishioka |
| 2003/0138146 | A1 | 7/2003 | Johnson |
| 2003/0174165 | A1 | 9/2003 | Barney |
| 2005/0256887 | A1 | 11/2005 | Eiron |
| 2005/0278325 | A1 | 12/2005 | Mihalcea |
| 2006/0004809 | A1 | 1/2006 | Zhang |
| 2006/0047632 | A1 | 3/2006 | Zhang |
| 2007/0033170 | A1 | 2/2007 | Sull |
| 2007/0078846 | A1 | 4/2007 | Gulli |
| 2008/0059454 | A1 | 3/2008 | Andrieu |
| 2008/0091670 | A1 | 4/2008 | Ismalon |
| 2008/0215561 | A1 | 9/2008 | Yu |
| 2008/0270390 | A1 | 10/2008 | Ward |

OTHER PUBLICATIONS

Dalal & Triggs, Histograms of Oriented Gradients for Human Detection, Proceedings of the 2005 IEEE Computer Society Conference on Computer Vision and Pattern Recognition, pp. 886-893, Jun. 2005 [online][retrieved on Jan. 7, 2009][retrieved from http://www.lear.inrialpes.fr/people/triggs/pubs/Dalal-cvpr05.pdf], 2005, pp. 1-8.

Dean and Ghemawat, MapReduce: Simplified Data Processing on Large Clusters [online] [retrieved on Sep. 28, 2009] [retrieved from: http://labs.google.com/papers/mapreduce-osdi04.pdf], pp. 1-12.

Fan et al., Seeded region growing: an extensive and comparative study, Pattern Recognition Letters, 26, pp. 1139-1156, 2005.

Felzenswalb and Huttenlocher, Efficient Graph-Based Image Segmentation Int J of Computer Vision, 59(2): 2004, [on-line] [retrieved on Jan. 28, 2009] [retrieved from: http://people.cs.uchicago.edu/~pff/papers/seg-ijcv.pdf], 26 pages.

Jing and Baluja. PageRank for Product Image Search, Proceedings of WWW 2008 Refereed Track: Rich Media, Apr. 21-25, 2008, Beijing, China [online][retrieved on Jan. 7, 2009][retrieved from http://www.docstoc.com/docs/529160/PageRank-for-Product-Image-Search], 2008, pp. 307-314.

Ke & Sukthankar, PCA-SIFT: A More Distinctive Representation for Local Image Descriptors, Proceedings of Computer Vision and Pattern Recognition, 2004 [online][retrieved on Jan. 7, 2009][retrieved from http://www.cs.cmu.edu/~rahuls/pub/cvpr2004-keypoint-rahuls.pdf], 8 pages.

Kim et al. Visual Categorization Robust to Large Intra-Class Variations Using Entropy-Guided Codebook, Proceedings of IEEE Conference on Robotics and Automation, International Internat. Conf. on Robotics and Automation, Roma, Italy, Apr. 10-14, 2007, pp. 3793-3798.

Kleinberg JM, Authoritative Sources in a Hyperlinked Environment [on-line] [retrieved on Sep. 28, 2009] [retrieved from: http://www.cse.msu.edu/~cse960/Papers/LinkAnalysis/auth.pdf] 1998, 34 pages.

Kleinberg JM, Hubs, Authorities, and Communities [on-line] [retrieved on Jan. 13, 2010], [retrieved from: http://www.cs.brown.edu/memex/ACM_HypertextTestbed/papers/10.html], 1999, 5 pages.

Li, T. Learning Optimal Compact Codebook for Efficient Object Categorization, Applications of Computer Vision, 2008. WACV 2008. IEEE Workshop on Jan. 7-9, 2008, [on-line] [retrieved on Jan. 15, 2010] [Retrieved from IEEE Xplore], 6 pages.

Lowe, D.G. Distinctive Image Features from Scale-Invariant Keypoints, Inter J of Computer Vision, 60: 2, 2004, pp. 91-110 [online][retrieved on Jan. 7, 2009][retrieved from http://www.cs.ubc.ca/~lowe/papers/ijcv04.pdf], 2004, 28 pages.

Moosmann, et al. Fast Discriminative Visual Codebooks Using Randomized Clustering Forests Neural Information Processing Systems, 2006 [online][retrieved on Jan. 7, 2009][retrieved from http://eprints.pascal-network.org/archive/00002438/01/nips.pdf], 7 pages.

Namboodiri and Jain, Document Structure and Layout Analysis, Digital Doc. Proc: Major Dir. And Recent Adv., 17 pages.

Nistér and Stewénius, Scalable Recognition with a Vocabulary Tree, Proceedings of IEEE Conference on Computer Vision and Pattern Recognition, New York, pp. 2161-2168, Jun. 2006 [online] [retrieved on Jan. 7, 2009] [retrieved from http://vis.uky.edu/~stewe/publications/nister_stewenius_cvpr2006.pdf], 8 pages.

Page et al., The PageRank Citation Ranking: Bringing Order to the Web [online] [retrieved on Sep. 28, 2009] [retrieved from: http://ilpubs.stanford.edu:8090/422/1/1999-66.pdf] 1998, 17 pages.

Rafiei and Mendelzon, What is this Page Known for? Computing Web Page Reputations [online] [retrieved on Sep. 28, 2009] [retrieved from: http://www.cs.toronto.edu/db/WebPage/files/WhatIsThisPageKnownFor.pdf] 2000, 17 pages.

BOOK CONTENT ITEM SEARCH

CROSS-REFERENCE TO RELATED APPLICATIONS

This application is a continuation of U.S. patent application Ser. No. 13/764,013, filed Feb. 11, 2013, which is a continuation of U.S. patent application Ser. No. 13/298,348, filed Nov. 17, 2011 and issued as U.S. Pat. No. 8,375,036 on Feb. 12, 2013, which is a continuation of U.S. patent application Ser. No. 12/351,336, filed on Jan. 9, 2009 and issued as U.S. Pat. No. 8,095,546 on Jan. 10, 2012. The disclosures of the foregoing applications are incorporated herein by reference in their entirety.

BACKGROUND

This specification relates to digital information retrieval, and particularly to processing search results relating to books.

The Internet enables access to a wide variety of content items, e.g., text, video and/or audio files, web pages for particular subjects, or news articles. A search engine can identify content items in response to a user query that includes one or more search terms or phrases, and provides links to the identified content items in the form of search results.

Some search engines rank search results based on a relevance of the content item to the search query and a relative importance of the content item with respect to other content items. For example, a search engine can determine a relevance score that represents the relevance of the content item to the search query. Additionally, web pages can be ranked based, in part, on the number of web pages that include a hypertext link to each of the respective web pages. Some search engines calculate scores for content items that indicate the relative importance of a content item with respect to other content items independent of the content item's relevance to a particular search query. In some situations, however, only web pages that are identified in response to a search query are ranked. The relevance scores and ranks of web pages can be used to rank the search results.

Book content items include the text, images and other information that are presented as a book. The text on each page of a book can be scanned by a content item publisher so that the entire text of the book is available for presentation on a user device. Similar to web pages, book content items can be searched by a search engine to respond to a search query to generate a relevance score for the book content item relative to the search query. However, unlike web pages, there are not typically many hypertext links to book content items from other content items. Therefore, an optimal ordering of search results for book content items may not be achieved.

SUMMARY

In general, one aspect of the subject matter described in this specification can be implemented in methods that include the actions segmenting textual content for each of a plurality of distinct book content items into word strings, each word string including a predefined number of contiguous words in the textual content of a book content item; classifying word strings having a frequency of occurrence that is less than a threshold frequency of occurrence as uncommon word strings, the frequency of occurrence for each word string being a number of occurrences of the word string relative to the total number of word strings in the plurality of distinct book content items; representing the distinct book content items as a graph in computer memory, where each of the distinct book content items is represented as a distinct node in the graph and where an edge exists in the graph between each pair of distinct nodes that represent distinct book content items that both include a matching uncommon word string; and determining a rank score for each distinct book content item based on the edges between the distinct nodes representing the distinct book content items, the rank score being a score indicative of the importance of each distinct book content item relative to other distinct book content items. This and other embodiments of this aspect include corresponding systems, apparatus, and computer program products.

Particular embodiments of the subject matter described in this specification can be implemented so as to realize one or more of the following advantages. Optimized search results for book content items can be generated by ordering search results for book content items based on rankings of weighted graph nodes corresponding to the book content items. Book content items can be ranked by a link-based authority process regardless of whether the book content items include explicit links. Implicit links are identified between book content items are identified from uncommon phrases and/or similar image features.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

Figure 1:
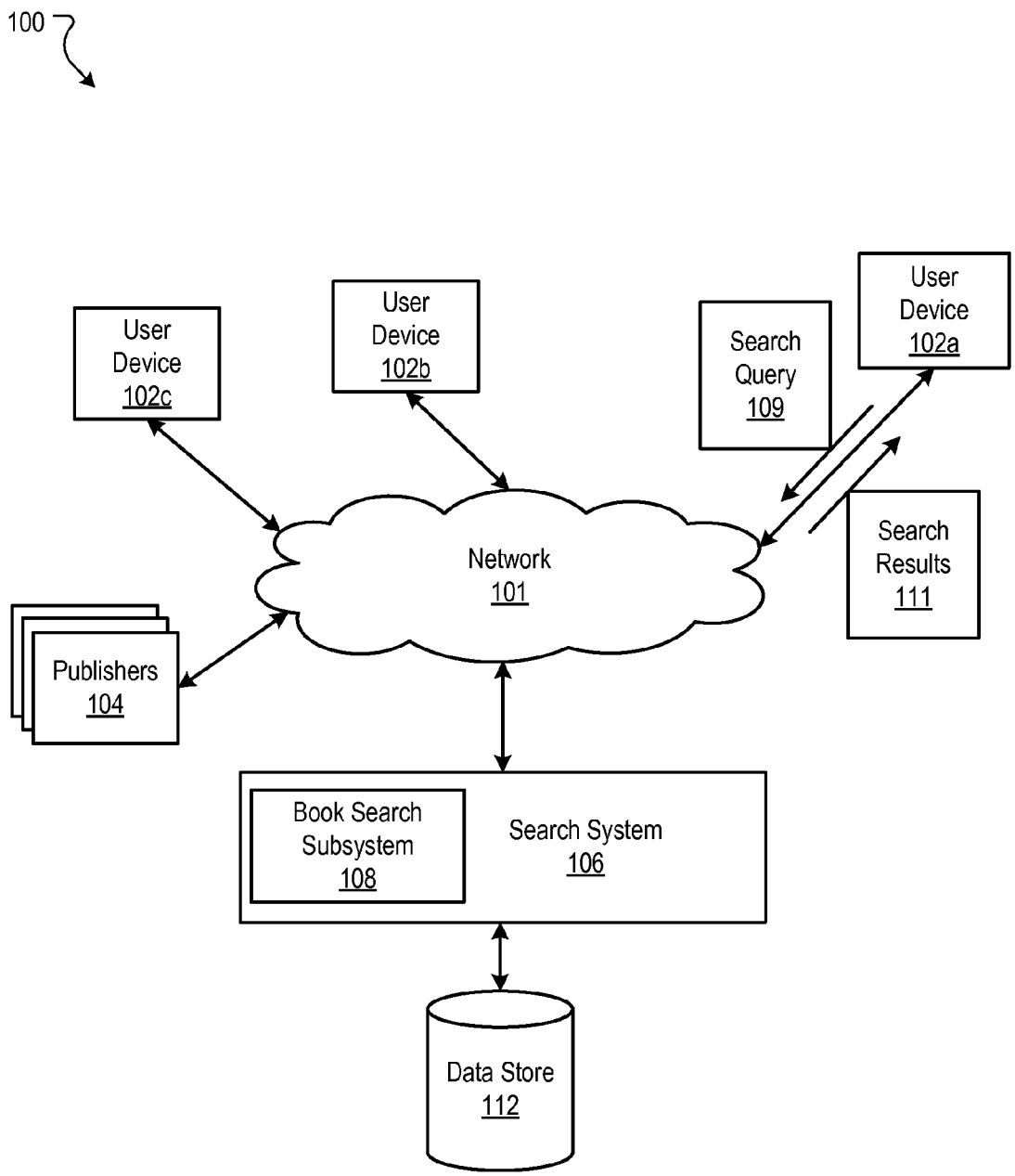
FIG. 1 is a block diagram of an example online search environment.

A book search system ranks book content items based on links between distinct book content items. A distinct book content item is a book content item for which aggregate content of the book is distinct from the aggregate content of other book content items. The links can be implicit links that are defined based on the identification of matching features in the book content items. In some implementations, the matching features are matching uncommon phrases and/or similar images that appear in the book content items.

As used throughout this disclosure, the terms "phrase" and "word string" are defined as n-grams of words, where n is 1 or an integer greater than 1, and are used interchangeably. Additionally, as used throughout this disclosure, the terms "book content item" and "distinct book content item" are used interchangeably to refer to distinct book content items. The terms "node" and "distinct node" are also used interchangeably throughout this disclosure to refer to a node that represents a distinct content item.

Matching uncommon phrases can be identified from the textual content of the book content item. The textual content of the book content item is segmented into word strings, each word string including a predefined number of words (e.g., a five-gram word string). Uncommon phrases are n-grams that occur less than a predefined percentage of a total number of n-grams. In some implementations, the predefined percentage can be different for each different value of n. Uncommon phrases are defined, for example, based on the frequency of occurrence of the word strings that appear in all of the book content items. In turn, uncommon phrases are identified in the book content items based on the defined uncommon phrases.

Once uncommon phrases are identified in book content items, the book search system identifies other book content items that contain matching uncommon phrases. An edge representing a link is generated in a weighted graph between pairs of nodes that represent book content items that contain the matching uncommon phrase. The edges can be weighted, for example, based on a number of matching uncommon phrases in the book content items. For example, if a first book content item includes two uncommon phrases and a second book content item includes two matching uncommon phrases, an edge is generated between nodes representing the first book content item and the second book content item that identifies the book content items as having two matching uncommon phrases. A sum of weighted edges is maintained for each node.

Similar image content that appears in book content items can be identified based on localized image features that describe localized portions of the images represented by the image content. The localized features can include, for example, colors of the images, edges of the images, and image intensities. The image content that appears in book content items is analyzed to identify localized image features and define descriptor points (e.g., vectors) that represent the localized features of the image content. The descriptor points can also identify the location (e.g., x, y coordinates) and/or orientation of the localized features in the image content.

Once descriptor points are defined for the image content of the book content item, the book search system identifies image content for other book content items that have matching or similar descriptor points. Similar image content is identified in other book content items based on the matching or similar descriptor points. For each pair of book content items in which similar image content is identified, an edge representing a link is generated between nodes representing the book content items in a weighted graph. In some implementations, the edges are weighted based on a level of similarity between the similar image contents. Additionally, each edge can be weighted based on a portion of the book content item that is occupied by the image content.

Book content items are ranked based on the total weight of edges connected to the node corresponding to the book content item. For example, the book content items can be ranked in descending order based on their corresponding edge weights. In some implementations, the ranking can be performed only on book content items that are identified in response to a search query received from a user device. In some implementations, the ranking can be based on book content items that are represented by a distinct node that is within a specified proximity of the node corresponding to the book content item that satisfies the search query. The proximity of a distinct node is represented by a number of links through which the distinct node is connected to the node corresponding to the book content items that satisfies the search query. For example, the ranking can be based on nodes for book content items that are connected by three or fewer links to the node of the book content item that satisfies the search query. Alternatively, the book search subsystem 108 can consider each distinct node regardless of its proximity to the distinct node that satisfies the search query but adjust the rank score of each book content item based on the proximity of the distinct node representing the book content item to a node representing the book content item that satisfies the search query. Search results can be ordered based on the respective rankings and provided to a user device.

§2.0 Example Online Search Environment

FIG. 1 is a block diagram of an example online search environment 100. A computer network 101, such as a local area network (LAN), wide area network (WAN), the Internet, or a combination thereof, connects user devices 102a, 102b and 102c, publishers 104, and a search system 106. The user devices 102a, 102b, and 102c can each be, for example, a desktop computer, laptop computer, personal data assistant, mobile phone, or any other device that can access content over the network 101. Although only three user devices 102a, 102b and 102c are shown, the online environment 100 may include many thousands of user devices. Similarly, although only one search system 106 is shown, the online environment may include other search engines.

The publishers 104 can include general content servers that receive requests for content (e.g., books, articles, discussion threads, music, video, graphics, search results, web page listings, information feeds, etc.), and retrieve the requested content in response to the request. For example, publishers 104 can receive a request for a book content item from a user device 102 and present the book content item to the user device 102 in response to the request. The request can be received, for example, based on the selection of a hypertext link that is presented on the publisher's webpage.

User devices 102a, 102b and 102c can access content items directly from the publishers 104 or through search results 111 provided by the search system 106. For example, user device 102 a can submit a search query 109 having one or more search terms to the search system 106 through the network 101. Based on the search query 109 the search system 106 can identify content items that are available from publishers 104 that satisfy the search query 109. In turn, the search system 106 can provide search results 111 to the user device 108a listing references (e.g., hypertext links) to the available content items.

The search system 106 can crawl network locations to identify content items that are available from the publishers 104. The search system 106 can generate an index of the identified content items and store the index in a data store 112. The content items can be indexed, for example, based on locations (e.g., uniform resource locators) of the content items, keywords associated with the content items and/or other characteristics that describe the content item.

An example search system 106 is described in the article S. Brin and L. Page, "The Anatomy of a Large-Scale Hypertextual Search Engine," Seventh International World Wide Web Conference, Brisbane, Australia and in U.S. Pat. No. 6,285, 999, the contents of which are incorporated herein by reference.

When the search system 106 receives a search query 109, the search system 106 can identify URLs that specify a location of content items related to the search query 109. For example, the search system 106 can access the index in the data store 112 to identify content items that are indexed with information that is related to the search query 109. In turn, the search system 106 can retrieve the URLs that are associated with the identified content items in the index.

The related content items can be identified based on the keywords that are associated with the content item in the index. In turn, the search system 106 can provide search results 111 that list the URLs or other references to the identified content items to the user device 108a. Search results 111 can include, for example, lists of content item titles, snippets of text extracted from those content items, and hypertext links to those content items, all of which may be grouped into a predetermined number (e.g., ten) of search results.

The search results 111 are ordered based on scores related to the content items identified by the search results 111, such as a relevance score, and optionally a separate ranking of each content item relative to other documents (e.g., a rank score). In some implementations, the relevance score is computed from dot products of feature vectors corresponding to a query and a content item, and the order of the search results 111 is based rankings that are a combination of the relevance scores and the rank scores. In some implementations, the relevance score is provided by a search engine.

In addition to identifying content items that satisfy the search query 109, the search system 106 ranks the search results 111. In some implementations, the rank or order can be determined, for example, based on the relative importance or authoritativeness of each of the identified content items that are referenced in the search results 111. The relative importance or authoritativeness of content items can be defined based on a number of explicit links between content items.

For example, a number of hypertext links to the content item by other content items can be used to determine the relative importance or authoritativeness of content items. A hypertext link from a first webpage to a second webpage can be considered a "vote" by the first webpage for the second webpage. This "vote" can be, for example, an indication that the publisher of the first webpage considers the second webpage a quality, authoritative or otherwise important webpage. Therefore, web pages that have a higher number of hypertext links to them can be considered more important or authoritative than web pages having a lower number of links to them. In turn, the order in which search results 111 are presented may be improved by presenting URLs for web pages to which a higher number of other web pages link higher in the search results, than URLs for web pages to which a lower number of other web pages link.

While hypertext links between content items can be used to rank the search results 111, not all content items may include hypertext links or other explicit links to obtain an optimal rank for the search results 111. Book content items are examples of a content item type that is made available by publishers 104 but generally do not include many, if any, explicit links to or from other content items. However, book content items may contain implicit links to and/or from other book content items that can be used to determine the relative importance of each book content item and, in turn, optimize the rank of search results 111 for book content items.

The search system 106 can include a book search subsystem 108 to optimize the ranking of search results 111 for book content items. The book search subsystem 108 identifies implicit links between book content items that are available from a publisher 104. Based on the identified implicit links, the book search subsystem 108 can optimize the ranking of search results 111 for book content items are presented, as described below.

In some implementations, the book search subsystem 108 can utilize the graph-based ranking procedure used to rank content items, as described above, to rank book content items.

For example, the book search subsystem 108 can utilize an authority-based ranking process that measures the importance of book content items relative to other book content items by use of implicit links. This ranking process can be implemented in the book search subsystem 108 or performed by an external system based on the implicit links that are identified in book content items by the book search subsystem 108.

Similar to the generalized search system 106, the book search subsystem 108 can crawl publisher web pages and/or other online locations to identify available book content items. Publishers 104 can make book content items available through the network 101, for example, by scanning pages of books and providing the scanned pages to user devices 102 in response to a request for the book content item. In some implementations, all of the book content items are made available by a single publisher 104 or a limited number of publishers 104, such that the locations of the book content items are known without the use of a crawler. Additionally, when a single publisher 104 or a limited number of publishers provide the book content items, the publisher(s) 104 can provide an indication identifying the book content item as such.

Typically, when the pages are scanned, the text and images that appear on the pages are stored as an image file. The scanned text can be recognized through optical character recognition. Textual content of a book content item is the content that is recognized as scanned text. The book content items can be indexed based on the textual content. Similarly, the book content items can be indexed based on uniform resource locators or other location identifiers for the book content items and/or other characteristics of the book content items. Therefore, identification of book content items that include text or are otherwise related to search terms in a search query 109 and their respective locations can be determined based on information stored in an index, for example, in the data store 112.

For example, a search query 109 for "impressionist paintings" may be received from the user device 108a to identify book content items about impressionist paintings. The search results 111 that are provided to the user device 108a may include, for example, a list of book content items that contain the terms "impressionist", "painting" or "impressionist paintings," either in the title of the book content items or in the rest of the textual content of the book content items. However, while book content items about impressionist paintings may include textual content that can facilitates identification of book content items that discuss impressionist paintings, there are likely few, if any, hypertext links between the book content items that discuss impressionist paintings or include images of impressionist paintings.

Similarly, a search query 109 for "Plato cave allegory" may be received from the user device 108a to identify book content items related to Plato's description of the allegory of the cave that appears in the book "The Republic." Book content items that discuss Plato's cave allegory can be identified based on the textual content of the book content items, as described above (e.g., based on keywords). However, without an indication of the importance of the book content items relative to the other identified book content items, it is possible that a search result 111 identifying a book content item representing the book, Plato's "The Republic," may not be one of the top search results 111, even though "The Republic" is the book in which Plato's expression of allegory of the cave appears. For example, book content items in which the terms "Plato," "cave" and "allegory" all appear within the title of the book content item, or in which the terms appear within the same sentence may appear higher in the search results than the book content item representing "The Republic."

Because few if any explicit links exist between book content items, book content items that discusses Plato's allegory of the cave are unlikely to include an explicit link to the book content item representing the book "The Republic." Therefore, explicit links may often not be used to determine the relative importance of book content items and, in turn, order search results 111 for book content items. However, the book search subsystem 108 can identify implicit links between the book content items to determine the relative importance of book content items and, in turn, order search results based on the relative importance of the book content items.

§3.0 Implicit Links

The book search subsystem 108 identifies implicit links between the book content items to determine the relative importance of the book content items. The relative importance of the book content items are, in turn, used to rank search results 111.

The implicit links can be identified, for example, based on matching features that are identified in the book content items. In some implementations, the implicit links are implicit text links based on similar textual content in the book content items and/or implicit image links based on similar images being included in the respective book content items. For example, book content items related to a common subject matter may each include the same uncommon phrase (e.g., n-gram word string) that may not appear in other book content items that are not related to the common subject matter. Similarly, book content items related to a common subject matter may include the same or similar images. Therefore, implicit links can be defined between pairs of book content items in which matching uncommon phrases and/or similar images appear. Identification of implicit links based on implicit text links is discussed first, followed by a discussion of identification of implicit image links.

While this disclosure discusses implicit links between books based on uncommon phrases and similar images, other matching features identified in book content items can be used to define implicit links between book content items and, in turn, determine the importance of each book content item relative to other book content items. Similarly, while identification of implicit links between book content items is discussed, implicit links can be identified between any distinct content items (e.g., web pages, videos or other content items) and can be used to rank these content items as well. Distinct content items can include content items that are located at distinct network locations.

§3.1 Implicit Text Links

The book search subsystem 108 can identify implicit text links between two book content items based on matching uncommon phrases that appear in both book content items. In some implementations, uncommon phrases are n-gram word strings that constitute less than a threshold percentage of all identified n-gram word strings. For example, uncommon phrases can be defined as a 5-gram word strings that constitutes less than 0.02% of all 5-gram word strings that are identified in the book content items. The corpus of all identified n-gram word strings can be based on all of the n-gram word strings that are identified in the book content items or can be based on a reference corpus of word strings that may not be based on the book content items.

In some implementations, the threshold percentage can be a predefined percentage of all identified n-gram word strings as described above. Thus, the number of uncommon word strings will vary based on the total number of word strings that are identified. For example, if the threshold percentage is defined as 0.02% of all 5-gram word strings, the number of uncommon 5-gram word strings will be 2,000 when the total number of 5-gram word strings is 10,000,000. Similarly, the number of uncommon 5-gram word strings will be 200 when the total number of 5-gram word strings is 1,000,000.

In some implementations, the threshold percentage can be defined based on the number of n-gram word strings that are defined as uncommon word strings relative to the total number of uncommon word strings that are identified. The number of uncommon word strings will remain constant, but the percentage of total word strings that are defined as uncommon word strings will vary based on the total number of word strings that are identified. For example, if the uncommon word strings are defined as the least common 1000 unique 5-gram word strings, then the threshold percentage will be defined based on the number of total 5-gram word strings that are identified. Thus, if 100,000 total 5-gram word strings are identified, the threshold percentage will be 1%. Similarly, if 10,000,000 5-gram word strings are identified, the threshold percentage will be 0.01%. Threshold percentages can be independently defined for 3-gram word strings, 4-gram word strings, and all other n-gram word strings.

In some implementations, the textual content of the book content items is provided by a third party. In other implementations, the textual content of book content items is provided through optical character recognition. To identify uncommon phrases through optical character recognition, the book search subsystem 108 can segment the recognized text into n-gram word strings. Each n-gram word string can include, for example, a predefined number of contiguous words (e.g., a five-gram word string). The predefined number of contiguous words that define the word string can be selected, for example, based on the application, processing resources and/or desired accuracy. The n-gram word strings can be identified with or without consideration of punctuation or other non-alphabetical symbols (e.g., hyphens, numbers, and quotations) that appear between the words in the n-gram word strings. While five-gram word strings are used for example purposes, other word string lengths can be used (e.g., four-gram word strings or six-gram word strings).

The book search subsystem 108 identifies unique word strings in the segmented text. Unique word strings are defined as a string of particular words in a particular order. Each unique word string can occur any number of times in the book content items. The book search subsystem 108 determines a frequency of occurrence of each unique word string based on the number of times that the unique word string occurs in the total number of word strings.

For example, the book search subsystem 108 may identify a unique word string that occurs 10,000 times out of 100,000,000 total identified word strings. This identified unique word string has a frequency of occurrence of 0.0001 (e.g., 10,000/100,000,000). The book search subsystem 108 can store data representing each unique word string that is identified in a book content item and its corresponding frequency of occurrence in a memory location in the index that corresponds to the book content item in which the unique word string is identified.

The book search subsystem 108 determines whether each unique word string is an uncommon word string, for example, by comparing the frequency of occurrence of the word string to the predefined percentage of total word strings that defines uncommon word strings. For example, an uncommon word string can be defined as a word string that constitutes no more than 0.02% of the total word strings. Based on this example predefined percentage, the book search subsystem 108 will define the example unique word string above as an uncommon word string because it constitutes 0.01% of the total identified word strings.

In other implementations, rather than calculating the frequency of occurrence for each unique word string, the book search subsystem 108 can access a reference source that defines an expected frequency of occurrence for word strings. The book search subsystem 108 can use the reference source to define uncommon words strings and determine whether an identified word string is an uncommon word string. The reference source can be used, for example, as an estimation of the frequency of occurrence of words strings found within the book content items. An example reference source that defines the expected frequency of occurrence of five word strings based on words strings is located at the uniform resource locator http://googleresearch.blogspot.com/2006/08/all-our-n-gram-are-belong-to-you.html. This reference source was generated based on five word strings that occur on the Internet. While a particular reference source is identified for example purposes, other reference sources can be used.

When a reference source is used to determine whether a word string is an uncommon word string, the book search subsystem 108 can define uncommon phrases in the reference source as those word strings in the reference source that constitute less than the predefined percentage of all word phrases that are included in the reference source. For example, if the above identified reference source includes 1,176,470,663 unique word strings and an uncommon word string is defined as a word string that constitutes no more than 0.01% of unique word strings in the reference source, then the book search subsystem 108 can define uncommon word strings in the reference source as those word strings that occur no more than 117,647 times (e.g., 1,176,470 663*0.01%).

The book search subsystem 108 can compare each identified word string in the book content items to the defined uncommon phrases in the reference source. If a word string from the book content items is included in the list of uncommon phrases in the reference source, the book search subsystem 108 can define the word string from the book content items as an uncommon word string. However, if a word string from the book content items is not included in the list of uncommon phrases, the book search subsystem 108 can define the word string as a common word string.

As discussed, an index of book content items available from publishers 104 is stored in the data store 112. The book search subsystem 108 can store a reference to each identified word string in a book content item at a memory location in the data store 112 that is associated with the book content item. The book search subsystem 108 can also store an indicator (e.g., a flag) that identifies each word string as an uncommon word string or a common word string. The book search subsystem 108 can examine the textual content of each book content item that is available from a publisher 104 in a similar manner as that discussed above to identify uncommon word strings in each book content item.

Once the book search subsystem 108 has examined the textual content of a particular book content item available from a publisher 104, the book search subsystem 108 can identify other book content items that contain uncommon word strings that match uncommon word strings contained in the particular book content item. In some implementations, a match between uncommon word strings is defined as an exact match of each word and each word's relative placement in the uncommon word string and a matching uncommon word string. In other implementations, a match can be defined between words stings that are similar even though there is not an exact match of all words and each word's relative placement in the uncommon word string and the matching uncommon word string. For example, if particularly uncommon words are included in the uncommon word string the book search subsystem 108 can still identify a matching uncommon word string that includes the particularly uncommon words, despite the fact that the matching uncommon word string may include one or more different words than the uncommon word string. Particularly uncommon words are those words that occur less than a second predefined percentage (e.g., 0.0001%) of all identified words.

In response to identifying a pair of book content items that include a matching uncommon word string, the book search subsystem 108 can define the pair of book content items as including an implicit text link to each other. The implicit text link can be considered a "vote" by each of the book content items for the other book content item based on its inclusion of the matching uncommon word string.

The book search subsystem 108 can store data in the index that represents the implicit text link between the pair of book content items. For example, the book search subsystem 108 can store a reference to each book content item containing the matching uncommon word string in a data location associated with the other book content items also containing the matching uncommon word string.

In some implementations, the implicit text links can be used to generate a weighted graph in which edges between nodes represent the implicit text links between the book content items represented by the nodes. In turn, search results 111 can be ranked based on the edges that are connected to nodes in the weighted graph. The rankings of the book content items, in turn, can be used to determine an optimized order for search results 111.

Figure 2:
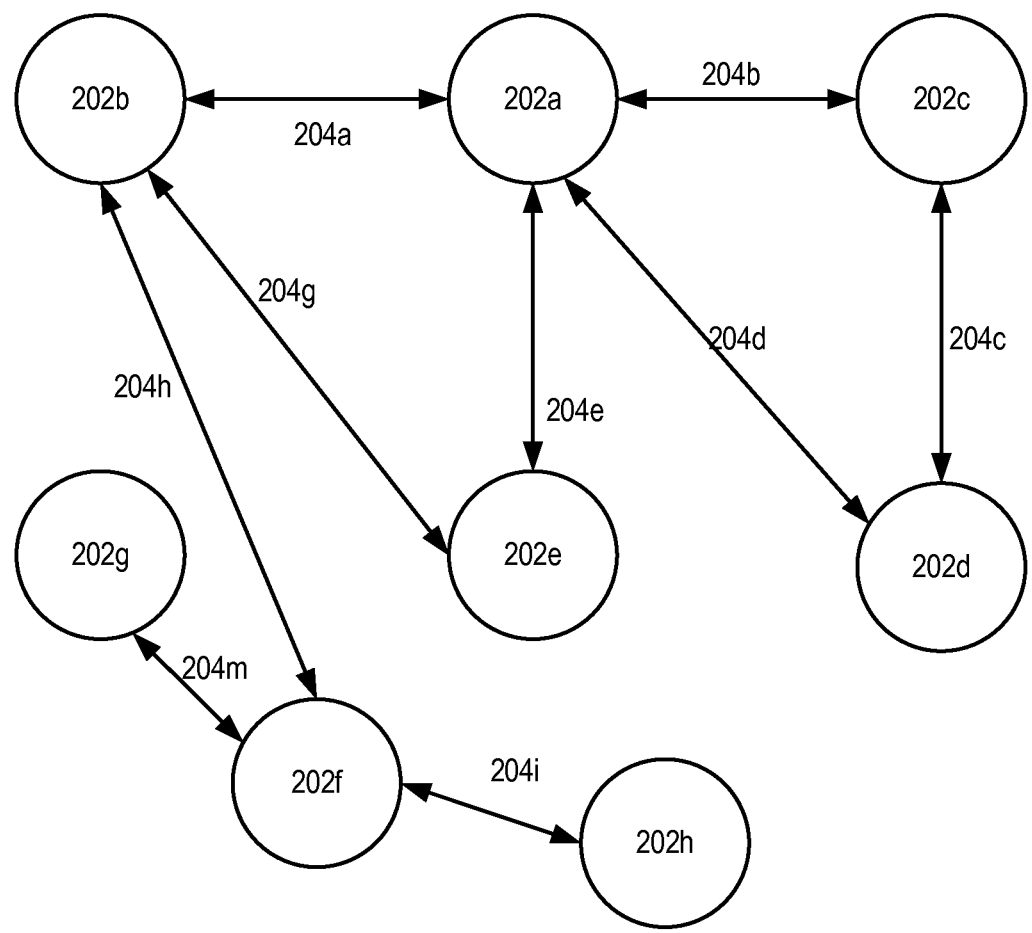
FIG. 2 is an illustration of an example weighted graph.

FIG. 2 is an illustration of an example weighted graph 200. The book search subsystem 108 defines a node 202 in the weighted graph 200 for each book content item that is included in the index. For example, node 202*a* can be defined by the book search subsystem 108 to represent a book content item representing Plato's "The Republic." Each of the other nodes 202*b*-202*h* can represent, for example, other book content items that are available from publishers 104.

For each book content item represented by the nodes 202*a*-202*h*, the book search subsystem 108 accesses the index to identify the uncommon word strings that appear in the book content item. A book content item that includes an uncommon word string can be identified, for example, based on the uncommon word string indicators that are stored in the index at memory locations associated with the book content item. In turn, the book search subsystem 108 determines if there is a match between any of the uncommon word strings identified for a candidate node (e.g., node 202) and the uncommon word strings identified for the other nodes (e.g., nodes 202*b*-202*h*). If a match is identified between any uncommon word strings for the candidate node and the uncommon word strings identified for the other nodes, the book search subsystem 108 generates an edge 204 between the candidate node and any nodes for which a matching uncommon word string was identified.

For example, the book search subsystem 108 can identify the word string "mob of sages circumventing Zeus" as an uncommon word string for node 202*a* because it is an uncommon word string that occurs in "The Republic," which is the book content item corresponding to node 202*a*. The book search subsystem 108 can compare this uncommon word string for node 202a to the uncommon word strings identified for nodes 202b-202h. Based on the comparison, the book search subsystem 108 may determine that the uncommon word string "mob of sages circumventing Zeus" also appears in the book content items that are represented by nodes 202b, 202c, 202d and 202e. Therefore, the book search subsystem 108 can generate an edge between node 202a and each of 202b, 202c, 202d and 202e if an edge does not already exist, or increment a weighting of an existing edge between the nodes, as described below.

In some implementations, the relative importance of each node 202 can be determined based the edges 204 that are connected to each node 202. For example, node 202a is connected to edges 204a, 204b, 204d, and 204e and node 202c is connected to edges 204b and 204c. Assuming that all of the edges 202a-202e have equal weighting, the number of edges connected to the nodes 202a and 202c can be respectively summed to determine a score for each node. In this example, node 202a has a relative score of four because node 202a is pointed to by four edges, while node 202c has a relative score of two because node 202c is pointed to by two edges.

The book search subsystem 108 can rank nodes based on their relative scores. For example, the book search subsystem 108 can rank nodes in descending order according to their relative scores. In the example above, the book search subsystem 108 will rank node 202a higher than node 202c based on their relative scores. Therefore, the book search subsystem 108 considers node 202a to be a more important or authoritative node than node 202c.

The search system 106 can thereafter rank search results 111 for the book content based on the ranking of the nodes 202 and the relevance of the book content for each node to a query.

In some implementations, the weighted graph can be generated recursively so that each edge 204 that is connected to a node 202 can be weighted based on the relative importance of the node 202 from which the edge originates. In the weighted graph 200, more edges point to node 202b than point to node 202d. Therefore, the book search subsystem 108 may consider node 202b a more important node than node 202d in the weighted graph 200. Thus, the book search subsystem 108 can assign a higher weight to an edge 204a that originates from node 202b than an edge 204c that originates from node 202d because the edge 204a originates from a relatively more important node than the edge 204c.

Weighting edges 204 based on the relative importance of the node 202 from which the edge originates can result in a node 202 to which fewer edges 204 are connected having a higher score than a node 202 to which more edges 204 are connected. For example, node 202c has two edges 204b and 204c connected to it, while node 202f has three edges 204i, 204h and 204m connected to it. As discussed above, if all of the edges 204 are weighted equally, then node 202f will have a higher score than node 202c. However, if the edges 204 are weighted based on the relative importance of the nodes 202 from which the edges 204 originate, then it is possible that node 202c will have a higher score than node 202f because edges 204b and 204c originate from nodes to which more edges 204 are connected.

In some implementations, each edge 204 can be weighted based on a number of uncommon word strings that are identified as appearing in a pair of nodes. For example, if node 202a and node 202b both include the same two distinct uncommon word strings (e.g., a first uncommon word string and a second uncommon word string), the weight of the edge 204a can be increased to represent an increased relatedness between book content items that are represented by the nodes 202a and 202b because of each node's inclusion of more than one matching uncommon word string.

As illustrated in FIG. 2, each edge created between two nodes based on matching uncommon word strings can be bidirectional in nature. For example, when the same uncommon word string is identified in book content items represented by node 202a and node 202b, an edge is generated from node 202a to node 202b and from node 202b to node 202a. In FIG. 2, these two edges between nodes 202a and 202b are represented by a single edge having a bidirectional component (e.g., an edge having an arrow on both ends) 204a to simplify the drawing. However, edge 204a can be represented by two separate unidirectional arrows.

While the edges 204 may be represented by a single bidirectional edge or two unidirectional edges, each directional component of the edge 204 can have a weighting that is independent from the other directional component. For example, each directional component of an edge can also be weighted based on the relative importance of the node from which the edge originates, as discussed above. Additionally, each directional component of each edge 204 can also be weighted based on a portion of the book content item and/or textual content the matching word string constitutes. For example, a matching word string that occurs 10 times in a first book content item having 100,000 word strings constitutes 10/100,000 of the textual content for the first book content item. This matching word string may be more meaningful in the first book content item than in a second book content item where the same word string occurs 11 times out of 150,000 word strings because the word string only constitutes 11/150,000 of the textual content for the second book content item while constituting 10/100,000 of the textual content of the first book content item. Thus, the weight of an edge from the node representing to the first book content item to a node representing the second book content item can be lower than the weight of the edge from the node representing the second book content item to the node representing the first book content item.

§3.2 Implicit Image Links

The book search subsystem 108 can also identify implicit image links between book content items based on similar images that appear in the book content items. In some implementations, the images of book content items are provided by a third party. In other implementations, the images are identified by scanning the books from which the book content items are generated.

When pages of a book are scanned, the text and images can be stored as an image file and the scanned text can be recognized by optical character recognition. In some implementations, portions of the image file that are not recognized by optical character recognition and are not blank are defined as images. "Not blank" portions of the image file are portions of the image file that are not identified as background of the page. "Not blank" portions of the image file can be identified by comparing the information in the portion of the image file to portions of the image file that are defined as the background of the page.

For example, areas of the image file adjacent to identified text can be defined as background of the page. Therefore, the color, intensity and other characteristics of the page stored for these portions of the image file can be compared to other areas of the image file. If there is a match, the other areas of the image file can be defined as blank. If there is not a match, then the other areas of the image file can be defined as "not blank."

By identifying the textual content of the book content item and the blank portions of the image file, the book search subsystem 108 can identify images that appear in the book content items in portions of the image file that are not textual content and not blank.

Once the book search subsystem 108 identifies images that appear in book content items, the book search subsystem 108 can identify localized features of the images. Localized features are discrete components of an image that occur in localized areas of the image. The localized area of an image can be, for example, a portion of the image, the border of which can be defined by rectangles, circles or other shapes.

The localized features can describe, for example, the colors of an image, the edges of an image, a histogram of the direction of edges in the region of the image, the principal components of the intensities of the region of the image among other features of the image. Examples of localized features include, for example, Harris corners, scale invariant feature transform (SIFT), shape contexts and spin images.

Once localized features are identified, the book search subsystem 108 can define descriptor points that represent the identified localized features. The descriptor points can be vectors of numbers that describe the identified localized features. For example, the edges, colors and intensities of a localized area of an image can be represented by a vector [A, B, C], where A, B and C are values that define the edges, colors and intensities of the localized area. The descriptor points can include a location (e.g., x, y coordinates) at which the localized feature was identified in the image. The descriptor points can also include an orientation of the localized feature in the image. Each image can be defined by multiple descriptor points. The book search subsystem 108 can store descriptor points for each image at memory locations in the index corresponding to the book content item in which the image appears.

In some implementations, the book search subsystem 108 can identify other book content items that include similar images based on the descriptor points that are stored in the index at memory locations corresponding to the other book content items. For example, if a first book content item includes an image of the Mona Lisa, the book search subsystem 108 can identify the descriptor points for the image of the Mona Lisa that are stored in the index at a memory location corresponding to the first book content item. In turn, the book search subsystem 108 can search the index to determine whether other book content items include images that are defined by descriptor points that match the descriptor points for the image of the Mona Lisa that appears in the first book content item.

A match between descriptor points can be defined as an exact match between the images' descriptor points or based on descriptor points that are determined to be similar enough that the images represent similar images. For example, features can be mapped to generalized sets of features so that features that are slightly different may still be considered matching. The level of similarity between descriptor points that is required to define a match can be adjusted based on the application, processing resources and/or a desired level of accuracy.

In some implementations, the book search subsystem 108 can require that there be a match between multiple localized features and, in turn, descriptor points in order to determine that two images are similar. For example, a single matching descriptor point between two images may only indicate that a small portion of each image includes the same features (e.g., colors, intensity, etc.). Therefore, if only a single matching descriptor point is required to identify similar images, then images that are in fact not very similar may be identified as similar based on a single matching descriptor point. However, the more matching descriptor points that are identified between the two images, the more likely it is that the images are in fact similar. The number of matching descriptor points required to identify a match between images can be adjusted based on the application, processing resources and/or a desired level of accuracy. Similarly, the matching descriptor points can be required to be identified in a similar geometric layout for the book search subsystem 108 to identify a match. For example, if five matching descriptor points are found between two images, the book search subsystem can require that the five matching descriptor points be in the same or a similar geometric layout to identify a similar image.

When the book search subsystem 108 identifies two book content items that include images that have a requisite number of matching descriptor points, the book search subsystem 108 determines that the two book content items include a similar image. In turn, the book search subsystem 108 defines the pair of book content items as including an implicit image link to each other based on the inclusion of a similar image in each of the book content items. As discussed, the implicit image links can be considered a "vote" for each of the book content items by the other book content item based on the inclusion of a matching similar image in each of the book content items.

In addition to identifying similar images in book content items, the book search subsystem 108 can identify an implicit link between two book content items based on a number of matching descriptor points that are located throughout the book content item. In some implementations, an implicit link between book content items can be identified when a minimum number of matching descriptor points within any images in the book content items are identified. For example, if one hundred matching descriptor points are identified between two book content items, an implicit link can exist between the book content items regardless of where the descriptor points are located in the book content items.

In some implementations, the book search subsystem 108 can store data in the index that represents the implicit link between a pair of book content items. For example, the book search subsystem 108 can store a reference to each of the book content items containing the similar image in memory locations corresponding to the other book content items containing the similar image.

The book search subsystem 108 generates a weighted graph based on the implicit image links between pairs of book content items. Returning to the example weighted graph of FIG. 2, each node 202 in the weighted graph 200 can represent a book content item that is included in the index and each edge 204 between nodes 202 in the weighted graph 200 represents an implicit link between the book content items represented by the nodes 202. Assume for this example that node 202a represents a book content item that contains a large number of images of impressionist paintings. Similarly, nodes 202b-202h can each be book content items about particular impressionist painters that each include at least one example of an impressionist painting.

For each book content item represented by the nodes 202a-202h in the weighted graph 200, the book search subsystem 108 accesses the index to identify image content that is included in the book content item and the image features for the image content. In turn, the book search subsystem 108 determines if there is a match between any of the corresponding image features identified for a candidate node (e.g., node 202a) and the image features identified for the other nodes (e.g., nodes 202b-202h), for example, by comparing the descriptor points of each corresponding node, as described above. If matching image content is identified for the candidate node and the other nodes based on the corresponding image features, the book search subsystem 108 generates an edge 204 between the candidate node and any nodes for which a matching image content was identified.

When the implicit links are based on matching image content appearing in the book content items, the book search subsystem 108 can weight the edges 204 between nodes 202 based on a number of matching images that are identified in the image content for the book content items that are represented by the nodes 202. The matching images are identified, for example, based on matching image features. The book search subsystem 108 can increase the weight of an edge 204 to represent an increased relatedness between the book content items represented by the nodes 202 that are connected by an edge 204.

For example, if node 202*a* and node 202*b* represent book content items that both have image content that includes the images Monet's "Bridge over the Thames" and "Waterloo Bridge, Grey Day" it is likely that the book content items represented by node 202*a* and node 202*b* are more related than book content items that include only a single matching similar image. Therefore, in response to identifying two similar images in the respective book content items, the weight of the edge 204*a* can be increased to reflect the increased relatedness between the book content items represented by the nodes 202*a* and 202*b*.

The book search subsystem 108 can also adjust the weighting of an edge based on a number of matching descriptor points identified between the image content for the book content items. For example, an edge based on image content for two book content items having a higher number of matching descriptor points can be weighted more heavily than an edge based on image content for two book content items having a lower number of matching descriptor points. Therefore, an increased weight of an edge can represent the increased similarities between the image content.

The edges created between two nodes based on matching image content can also be bidirectional. In some implementations, each directional component of the edge can have a weighting that is independent from the other directional component. The book search subsystem 108 can adjust the weight of an edge based, for example, on the relative importance of the node from which the edge originates.

The book search subsystem 108 can adjust the weight of an edge based on the number of images that are identified in the image content of a book content item. For example, an edge originating from a distinct node for a distinct book content item in which a large number of images are present can be weighted less than an edge originating from another node for another book content item in which fewer images are present. Weighting the edges based on the number of images present in the book content item reduces the possibility that edges from nodes for unrelated book content items improperly increase the relative importance of a particular node.

For example, a particular node for a particular book content item in which many unrelated images appear may have edges connecting to many other nodes for other book content items that are unrelated to each other. In this situation, the large number of edges between the particular node and the other nodes can result in the particular node being identified as an authoritative node for a particular topic, even though the particular book content item may only include one image related to the particular topic. Adjusting (e.g., reducing) the weight of edges originating from the particular node based on the number of images in the particular book content item normalizes the relative importance of the particular node so that a book content item containing a large number of images is not incorrectly identified as an authority on a particular subject based on the inclusion of few images related to the particular subject.

The book search subsystem 108 can also adjust edge weights based on whether the image content for one of the book content items is a subset, i.e., a smaller portion, of the image content for the other book content items. In some implementations, the book search subsystem 108 can determine whether the image content for a first book content item is a subset of image content for a second book content item based on the locations of the descriptor points. For example, if the matching descriptor points are located in a significantly smaller portion of a first image content than the portion of the second image content in which the matching descriptor points are located, the first image content may be a subset (e.g., zoomed version) of the second image content.

If the book search subsystem 108 determines that the first image content is a subset of the second image content, the book search subsystem 108 can assign a lower weight to edges connected to a node 202 that represents the book content item including the first image content than the weight assigned to edges connected to a node 202 that represents the book content item including the second image content.

For example, the first image content may be a close-up of the Mona Lisa's face and the second image content may be a picture of the entire Mona Lisa painting. The matching descriptor points that are identified between the first image content and the second image content will be located in the zoomed portion of Mona Lisa's face that is included in the first image content. Therefore, the matching descriptor points in the second image content will be located in the portion of Mona Lisa's face that is included in the first image content. In contrast, the matching descriptor points in the first image content will be located throughout the entirety of the first image content rather than a localized portion of the first image content.

Because the portion of the second image content in which the matching descriptor points are located is much smaller than the portion of the first image content in which the matching descriptor points are located, the book search subsystem 108 can define the first image content as a subset of the second image content. In turn, the book search subsystem 108 can define an edge connected to a node corresponding to the first image content with a lower weight than an edge connected to a node corresponding to the second image content because the image of the entire Mona Lisa painting may be considered more authoritative or important than a close-up of the Mona Lisa's face. The manner in which the book search subsystem 108 adjusts weights of edges between nodes can be adjusted based on the application, processing resources and/or desired accuracies.

The book search subsystem 108 can also adjust edge weights based on a total number of matching descriptor points identified in multiple images in each of the distinct book content items. In some implementations, the edges between the book content items can be weighted based on the total number of matching descriptor points, regardless of where the descriptor points are located in the respective book content items. For example, an edge between two nodes representing book content items having one hundred matching descriptor points can have a higher weight than an edge between two nodes representing book content items having ten matching descriptor points.

Additionally, the book search subsystem 108 can adjust edge weights based on the similarity of the geometric layout of the matching descriptor points. For example, an edge between two nodes representing book content items having matching descriptor points that are both arranged in the shape of a triangle can be weighted higher than an edge between two nodes representing book content items in which the descriptor points are arranged in distinct geometric forms (e.g., a square and a triangle).

Once the book search subsystem 108 has generated edges 204 corresponding to all of the similar images found in the book content items, the book search subsystem 108 can determine the relative importance of each node 202 and, in turn, corresponding book content items based on the resulting weighted graph 200, as described above (e.g., summing weights of edges connected to each node). The book search subsystem 108 or the search subsystem 106 can rank the book content items corresponding to the nodes 202 based on the scores, as described above. The search system 106 can thereafter rank the search results 111 for the book content items based on the rankings of the nodes 202 and the relevance of the book content items for each node to a query.

§4.0 Example Process Flows

Figure 3:
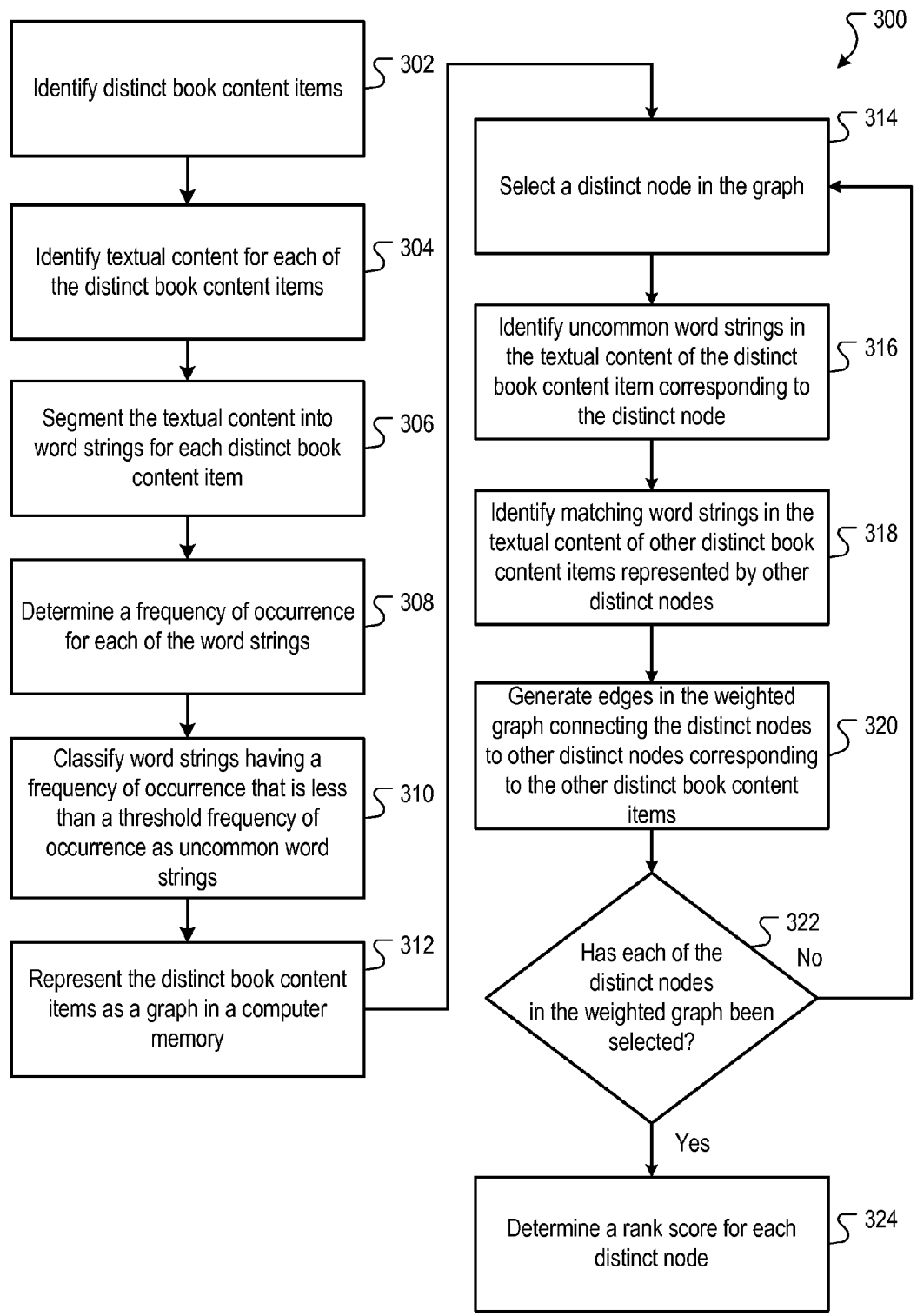
FIG. 3 is a flow chart of an example process for determining a rank score for book content items.

FIG. 3 is a flow chart of an example process 300 for determining a rank score for book content items. In some implementations, rank scores for book content items are based on implicit links between the book content items. For example, implicit links can be identified between the book content items based on uncommon word strings that appear in the book content items. The process 300 can be implemented, for example, by the search system 106 and/or book search subsystem 108 of FIG. 1.

Distinct book content items are identified (302). In some implementations, the distinct book content items are identified at online publisher locations. Each of the distinct book content items can be an electronic representation of a distinct book. For example, image files can include scanned representations of the pages of the distinct books that are represented by the distinct book content items.

Textual content is identified for each for each of the distinct book content items (304). In some implementations, the textual content can be identified through optical character recognition. The textual content can be identified, for example, by the search system 106 and/or book search system 108.

The textual content for each distinct book content item is segmented into word strings (306). In some implementations, each word string includes a predefined number of contiguous words. For example, each word string includes five contiguous words. Other numbers of contiguous words can define each word string separately or in conjunction with a first number of predefined contiguous words. The textual content can be segmented, for example, by the search system 106 and/or the book search subsystem 108.

A frequency of occurrence for each of the word strings is determined (308). In some implementations, the frequency of occurrence for each word string can be determined, for example, by incrementing a counter each time another word string matching the word string is identified and dividing a final count from the counter by a total number of identified word strings. The frequency of occurrence for each word string can be determined, for example, by the search system 106 and/or the book search subsystem 108.

Word strings that have a frequency of occurrence that is less than a threshold frequency of occurrence are classified as uncommon word strings (310). The frequency of occurrence of a word sting is the number of occurrences of the word string in all of the distinct book content items relative to a total number of word strings in all of the distinct book content items. In some implementations, the threshold frequency of occurrence is a predefined percentage of a total number of the word strings occurring in all of the distinct book content items. For example, if the predefined percentage is 0.02% and a particular word string constitutes 0.01% of the total number of word strings in all of the distinct book content items, then the particular word string is classified as an uncommon word string. The uncommon word strings can be classified, for example, by the search system 106 and/or the book search subsystem 108.

The distinct book content items are represented as a weighted graph in a computer memory (312). In some implementations, the weighted graph includes a plurality of distinct nodes. Each distinct node in the weighted graph represents a corresponding distinct book content item in the plurality of distinct book content items. The distinct book content items are represented as a weighted graph, for example, by the search system 106 and/or the book search subsystem 108.

A node in the weighted graph is selected (314). In some implementations, the node is selected, for example, by the search system 106 and/or the book search subsystem 108.

Uncommon word strings are identified in the textual content of the distinct book content item corresponding to the distinct node (316). The corresponding distinct book content item is the distinct book content item that is represented by the selected distinct node. The uncommon word strings for the distinct book content item can be identified, for example, based on an uncommon word string indicator (e.g., a flag) that is stored in an index at a memory location corresponding to the distinct book content item. The uncommon word strings can be identified, for example, by the search system 106 and/or the book search subsystem 108.

Matching word strings are identified in the textual content of other distinct book content items (318). In some implementations, each matching word string is a word string that matches an uncommon word string in the corresponding book. In some implementations, the matching word string can be required to match the uncommon word string exactly. In some implementations, the matching word string may not be required to exactly match all words and word placements in the uncommon word string, as described above. Matching word strings can be identified, for example, by the search system 106 and/or the book search subsystem 108.

Edges are generated in the weighted graph connecting the distinct node to other distinct nodes corresponding to the other distinct book content items (320). In some implementations, each edge represents one or more matches of an uncommon word string to one or more matching word strings in the textual content of another distinct book content item. For example, when matching uncommon word strings are identified as appearing in the textual content of two distinct book content items, an edge can be generated between the distinct nodes that represent the two distinct book content items in the weighted graph. A single edge can represent any number of matching uncommon word strings that are identified in the textual content of the two distinct book content items. In some implementations, the edges are weighted based on the number of matching uncommon word strings that are identified in the textual content of the two distinct book content items. Edges can be generated, for example, by the search system 106 and/or the book search subsystem 108.

A determination is made as to whether each of the distinct nodes in the weighted graph has been selected (322). The determination can be made, for example, by the search system 106 and/or book search subsystem 108. If each of the distinct nodes in the weighted graph has not been selected, another distinct node in the weighted graph is selected (314). The process 300 can be iteratively repeated and edge weights iteratively recalculated until a convergence limit is reached.

When each of the nodes in the weighted graph has been selected, a rank score is determined for each distinct node (324). In some implementations, the rank score of each node is based on the edges connecting the distinct nodes. For example, assuming that each edge is weighted equally, a distinct node to which more edges are connected can have a higher rank score than a distinct node to which fewer edges are connected. However, if the edges are not weighted equally, the rank score of each distinct node can be based on a total weight of the edges that are connected to the distinct node.

In some implementations, the weighted graph is generated for all distinct book content items in a corpus before query time. In other implementations, a weighted graph is generated only for distinct book content items that are identified in response to a search query at query time. The rank scores can be determined, for example, by the search system 106 and/or the book search subsystem 108.

Figure 4:
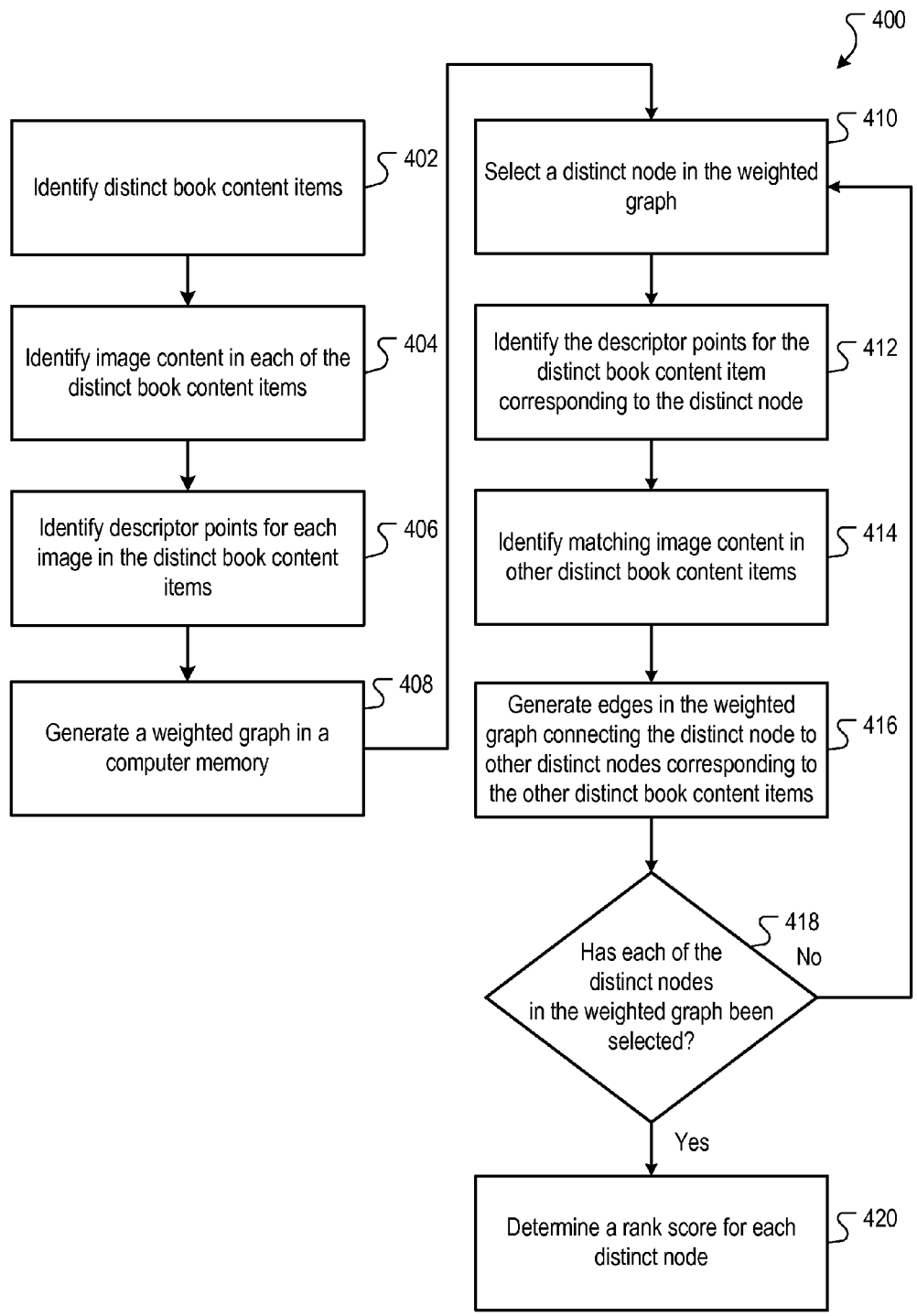
FIG. 4 is a flowchart of another example process for determining a rank score for book content items.

FIG. 4 is a flowchart of another example process 400 for determining a rank score for book content items. In some implementations, rank scores for book content items are based on implicit image links between the book content items. For example, implicit image links can be identified between the book content items based on similar images that appear in the book content items. The process 400 can be implemented, for example, by the search system 106 and/or book search subsystem 108 of FIG. 1.

Distinct book content items are identified (402). In some implementations, the distinct book content items are identified at online publisher locations. Each distinct book content items can be an electronic representation of a distinct book. For example, a distinct book content item can be an image file that includes scanned representations of the pages of a book.

Image content is identified in each of the distinct book content items (404). In some implementations, the image content is identified as content in an image file that is not recognized by optical character recognition. The image content can be identified, for example, by the search system 106 and/or book search system 108.

Descriptor points are identified for each image in the distinct book content items (406). In some implementations, the descriptor points can define image features. The image features can be discrete components of the image that occur in localized areas of the image (e.g., localized features). The descriptor points can describe, for example, the colors of the image, the edges of the image, a histogram of the direction of edges in the localized region of the image the principal components of the intensities of the localized region of the image as well as other image features. Descriptor points can be identified, for example, by the search system 106 and/or the book search subsystem 108.

Distinct book content items are represented as a weighted graph in a computer memory (408). In some implementations, the weighted graph includes a plurality of distinct nodes. Each distinct node in the weighted graph represents a corresponding distinct book content item in the plurality of distinct book content items. The weighted graph is generated, for example, the search system 106 and/or the book search subsystem 108.

A distinct node in the weighted graph is selected (410). In some implementations, the distinct node is selected, for example, by the search system 106 and/or the book search subsystem 108.

The descriptor points for the distinct book content item corresponding to the distinct node are identified (412). The descriptor points can be retrieved, for example, from a memory location in an index that corresponds to the image content of the distinct book content item represented by the distinct node. The descriptor points for the distinct node can be identified, for example, by the search system 106 and/or the book search subsystem 108.

Matching images are identified in other distinct book content items (414). Each matching image is an image that has image features that match the corresponding image features of an image in the distinct book content item corresponding to the distinct node. In some implementations, the matching image can be identified based on similarities between the images' descriptor points. For example, a matching image can be an image in another distinct book content item that has the exact same descriptor points as the image in the distinct book content item corresponding to the distinct node. Alternatively, a matching image can be an image in another distinct book content item that has descriptor points that are similar to the descriptor points for the image of the distinct book content item corresponding to the distinct node. The matching images can be identified, for example, by the search system 106 and/or the book search subsystem 108.

Edges are generated in the weighted graph connecting the distinct node to other distinct nodes corresponding to the other distinct book content items (416). In some implementations, each edge represents one or more matching images between the two distinct book content items that are represented by the two distinct nodes that are connected by the edge. For example, when matching images are identified as appearing in two distinct book content items, an edge can be generated between the distinct nodes that represent the two distinct book content items in the weighted graph. A single edge can represent any number of matching images that are identified in the two distinct book content items. In some implementations, the edges are weighted based on the number of matching images that are identified in the two distinct book content items. Edges can be generated, for example, by the search system 106 and/or the book search subsystem 108.

A determination is made as to whether each of the distinct nodes in the weighted graph has been selected (418). The determination can be made, for example, by the search system 106 and/or the book search subsystem 108. If each of the distinct nodes in the weighted graph has not been selected, another distinct node in the weighted graph is selected (412). The process 400 can be iteratively repeated and edge weights iteratively recalculated until a convergence limit is reached.

When each of the distinct nodes in the weighted graph has been selected, a rank score is determined for each distinct node (420). In some implementations, the rank score of each node is based on the edges connecting the distinct nodes. For example, assuming that each edge is weighted equally, a distinct node to which more edges are connected can have a higher rank score than a distinct node to which fewer edges are connected. However, if the edges are not weighted equally, the rank score of each node can be based on a total weight of the edges that are connected to the distinct node.

In some implementations, the weighted graph is generated for all distinct book content items in a corpus before query time. In other implementations, a weighted graph is generated only for distinct book content items that are identified in response to a search query at query time. The distinct nodes can be ranked, for example, by the search system 106 and/or the book search subsystem 108.

Figure 5:
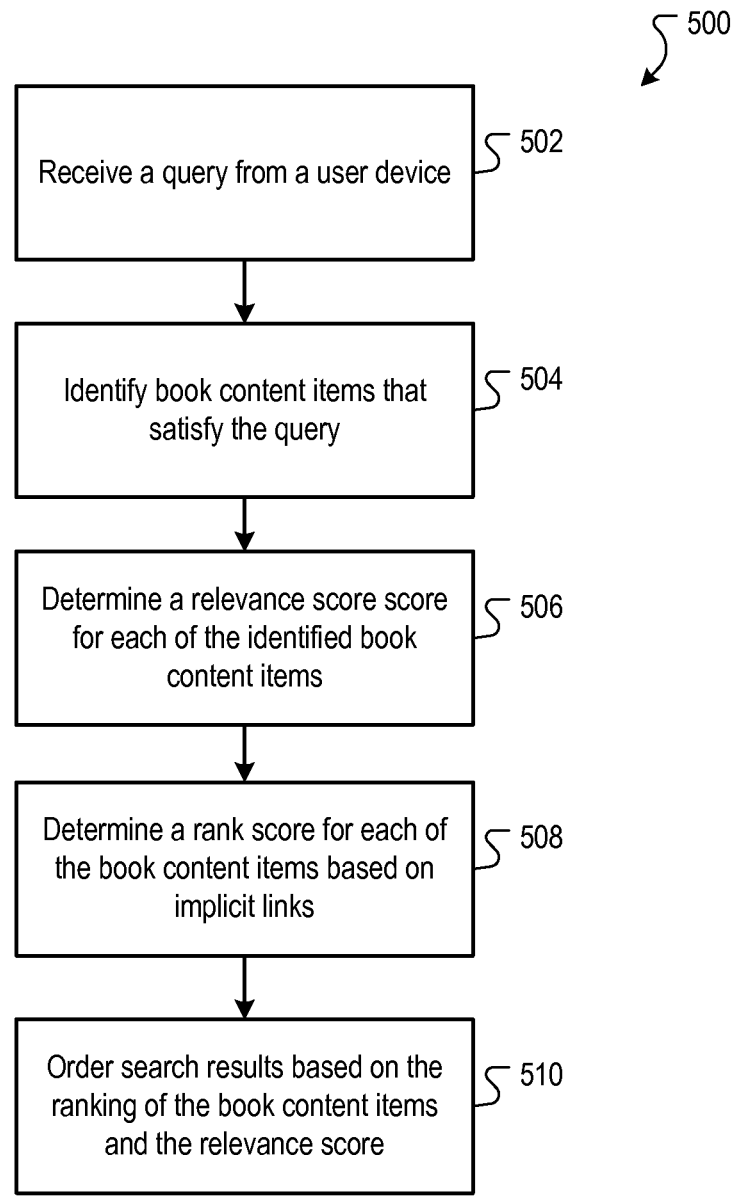
FIG. 5 is a flowchart of an example process for identifying book content items in response to a query

FIG. 5 is a flowchart of an example process 500 for identifying book content items in response to a query. The process 500 can be implemented, for example, by the search system 106 of FIG. 1.

A query is received from a user device (502). The query can be a search query for book content items that are available from a publisher. The query can include, for example, search terms that define characteristics of a book content item for which a user is searching. The query can be received, for example, by the search system 106 and/or book search subsystem 108 of FIG. 1.

Book content items are identified that satisfy the query (504). In some implementations, book content items can satisfy a search query by including textual content that corresponds to the search terms in the search query or being associated with keywords that correspond to the search query. For example, a book content item representing a book written by Plato may be associated with the keyword Plato in an index. In turn, the book content item representing the book written by Plato may be identified in response to a search query for "Plato." In some implementations, the book content items that satisfy the query can be provided by a search system.

A relevance score is determined for each of the identified book content items (506). The relevance scores are measures of the relevance of each book content item to the search query. For example, a book content item that contains a search term in the title of the book content item may have a higher relevance score than book content item that includes a search term in the rest of the textual content of the book content item. In some implementations, the relevance score can be provided by a search system.

A rank score for each of the book content items based on implicit links is determined (508). In some implementations, the ranking can be determined from a weighted graph based on implicit links in the book content items. For example, matching uncommon word strings or matching image features between two or more book content items can define implicit links between the two or more book content items. The implicit links can be weighted, for example, based on a level of relatedness between the two or more book content items.

Search results for book content items are ordered based on the rank scores for the book content items and the relevance scores (510). In some implementations, the search results can be ranked, for example, based on a combination (e.g., dot product) of the relevance score and the rank score of the book.

§6.0 Example Computer System

Figure 6:
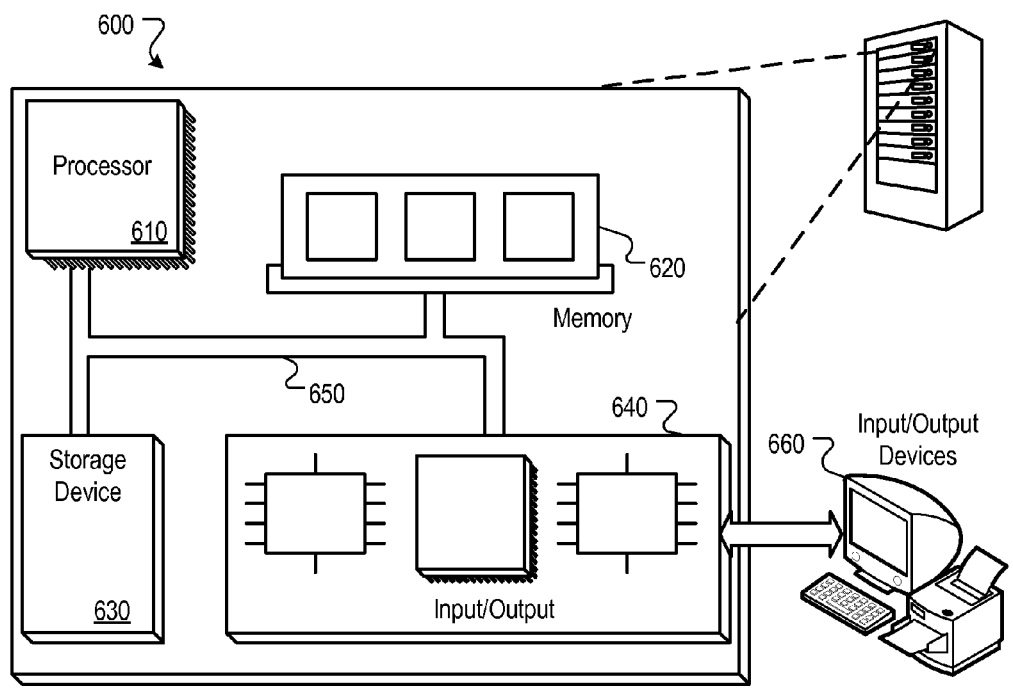
FIG. 6 is block diagram of an example computer system that can be used to facilitate a book content item search.

FIG. 6 is block diagram of an example computer system 600 that can be used to facilitate a book content item search. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660.

The book search subsystem 108 can be realized by instructions that upon execution cause one or more processing devices to carry out the processes and functions described above. The book search subsystem 108 can be distributively implemented over a network, such as a server farm, or can be implemented in a single computer device.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system," "processing devices" and "subsystem" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, data processing apparatus.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   identifying image features in images from a plurality of distinct content items;
   determining that, for a subset of the distinct content items, the content items in the subset each have respective images that have at least a minimum number of the identified image features in common;
   generating implicit links between the content items in the identified subset based on determining that the content items in the subset have at least the minimum number of the identified image features in common;
   assigning weightings to the implicit links between the subset of the content items; and
   determining a rank score for at least one of the content items in the subset based at least in part on the weightings of the implicit links, the rank score being a value indicative of the importance of the content item relative to others of the distinct content items.

2. The computer-implemented method of claim 1, wherein identifying image features in the images comprises identifying localized image features at particular locations in the images.

3. The computer-implemented method of claim 2, wherein identifying the localized image features comprises identifying, in a particular region of an image, a color, an edge, an edge direction, or an intensity.

4. The computer-implemented method of claim 2, wherein identifying the localized image features comprises identifying a corner feature, a scale-invariant feature, a shape context feature, or a spin image feature.

5. The computer-implemented method of claim 1, wherein assigning the weightings to the implicit links comprises assigning, to a particular implicit link between a first content item of the distinct content items and a second content item of the distinct content items, a weighting determined based at least in part on a number of identified image features in common between an image of the first content item and an image of the second content item.

6. The computer-implemented method of claim 1, further comprising representing the implicit links as weighted edges in a graph in which nodes represent corresponding content items, each weighted edge representing one or more matches of image content in between the content items corresponding to the nodes connected by the weighted edge.

7. The computer-implemented method of claim 1, wherein each of the distinct content items corresponds to a published book.

8. The method of claim 7, further comprising identifying descriptor points from the images appearing in the plurality of distinct book content items, the descriptor points defining localized features of the images, the localized features being characteristics of a portion of the image;
   wherein generating the implicit links comprises generating an implicit link between two or more distinct book content items that each include an image having a matching descriptor point, each matching descriptor point being identified based on similarities between pairs of descriptor points.

9. The method of claim 1, further comprising:
receiving a relevance score for each of the plurality of distinct content items, the relevance score being a measure of relevance of the distinct content item to a search query;
ranking the plurality of distinct content items based on the rank score and the relevance score; and
ordering search results for the content items, the search results being ordered according to the ranking of the plurality of distinct content items.

10. A system, comprising:
a data processing apparatus; and
a data store storing instructions that, when executed by the data processing apparatus, cause the data processing apparatus to perform operations comprising:
identifying image features in images from a plurality of distinct content items;
determining that, for a subset of the distinct content items, the content items in the subset each have respective images that have at least a minimum number of the identified image features in common;
generating implicit links between the content items in the identified subset based on determining that the content items in the subset have at least the minimum number of the identified image features in common;
assigning weightings to the implicit links between the subset of the content items; and
determining a rank score for at least one of the content items in the subset based at least in part on the weightings of the implicit links, the rank score being a value indicative of the importance of the content item relative to others of the distinct content items.

11. The system of claim 10, wherein assigning the weightings to the implicit links comprises assigning, to a particular implicit link between a first content item of the distinct content items and a second content item of the distinct content items, a weighting determined based at least in part on a number of identified image features in common between an image of the first content item and an image of the second content item.

12. The system of claim 10, wherein the operations further comprise representing the implicit links as weighted edges in a graph in which nodes represent corresponding content items, each weighted edge representing one or more matches of image content in between the content items corresponding to the nodes connected by the weighted edge.

13. The system of claim 10, wherein each of the distinct content items corresponds to a published book.

14. A non-transitory computer-readable medium encoded with a computer program comprising instructions that when executed operate to cause a computer to perform operations comprising:
identifying image features in images from a plurality of distinct content items;
determining that, for a subset of the distinct content items, the content items in the subset each have respective images that have at least a minimum number of the identified image features in common;
generating implicit links between the content items in the identified subset based on determining that the content items in the subset have at least the minimum number of the identified image features in common;
assigning weightings to the implicit links between the subset of the content items; and
determining a rank score for at least one of the content items in the subset based at least in part on the weightings of the implicit links, the rank score being a value indicative of the importance of the content item relative to others of the distinct content items.

15. The non-transitory computer-readable medium of claim 14, wherein assigning the weightings to the implicit links comprises assigning, to a particular implicit link between a first content item of the distinct content items and a second content item of the distinct content items, a weighting determined based at least in part on a number of identified image features in common between an image of the first content item and an image of the second content item.

16. The non-transitory computer-readable medium of claim 14, wherein the operations further comprise representing the implicit links as weighted edges in a graph in which nodes represent corresponding content items, each weighted edge representing one or more matches of image content in between the content items corresponding to the nodes connected by the weighted edge.

17. The non-transitory computer-readable medium of claim 14, wherein each of the distinct content items corresponds to a published book.

* * * * *